US010393982B2

(12) United States Patent
Powell et al.

(10) Patent No.: US 10,393,982 B2
(45) Date of Patent: Aug. 27, 2019

(54) REVERSIBLE INTERNET SERVICE PROVIDER WALL BOX

(71) Applicant: All Systems Broadband, Inc., Livermore, CA (US)

(72) Inventors: James A. Powell, Garner, NC (US); Shawn L. Heeter, Morrisville, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 15/940,027

(22) Filed: Mar. 29, 2018

(65) Prior Publication Data
US 2019/0154939 A1 May 23, 2019

Related U.S. Application Data

(60) Provisional application No. 62/589,175, filed on Nov. 21, 2017.

(51) Int. Cl.
*G02B 6/00* (2006.01)
*G02B 6/44* (2006.01)

(52) U.S. Cl.
CPC ........... *G02B 6/4466* (2013.01); *G02B 6/445* (2013.01); *G02B 6/4469* (2013.01); *G02B 6/4471* (2013.01)

(58) Field of Classification Search
CPC .... G02B 6/4466; G02B 6/445; G02B 6/4471; G02B 6/4469
See application file for complete search history.

(56) References Cited

U.S. PATENT DOCUMENTS

| | | | | |
|---|---|---|---|---|
| 8,660,397 | B2* | 2/2014 | Giraud | G02B 6/4441 385/135 |
| 9,323,020 | B2* | 4/2016 | Cao | G02B 6/4441 |
| 10,031,305 | B2* | 7/2018 | Leeman | G02B 6/4452 |
| 2002/0150372 | A1* | 10/2002 | Schray | G02B 6/3897 385/135 |
| 2005/0281526 | A1* | 12/2005 | Vongseng | G02B 6/3825 385/135 |
| 2006/0153516 | A1* | 7/2006 | Napiorkowski | G02B 6/445 385/135 |
| 2008/0285933 | A1* | 11/2008 | Vogel | G02B 6/4452 385/135 |
| 2009/0208178 | A1* | 8/2009 | Kowalczyk | G02B 6/4452 385/135 |

(Continued)

*Primary Examiner* — Ellen E Kim
(74) *Attorney, Agent, or Firm* — Murphy, Bilak & Homiller, PLLC

(57) ABSTRACT

A telecommunications box includes a base frame, having generally planar outer walls that form an enclosed loop around an interior volume. The outer walls include first and second sidewalls that are parallel to and spaced apart from one another. A flange adjoins front-facing edge sides of the outer walls and extends away from the outer walls in an opposite direction as the interior volume. A first window, which is partially defined by the front-facing edge sides of the outer walls, exposes the interior volume from a front side of the base frame. A second window, which is partially defined by rear-facing edge sides of the outer walls, exposes the interior volume from a rear side of the base frame. The first window occupies the same footprint in a front-facing position that the second window occupies in a rear-facing position that is rotationally reversed from the front-facing position.

12 Claims, 9 Drawing Sheets

(56) References Cited

U.S. PATENT DOCUMENTS

2010/0061693 A1\* 3/2010 Bran de Leon ...... G02B 6/4454
  385/135
2011/0262095 A1\* 10/2011 Fabrykowski ....... G02B 6/4466
  385/135
2012/0134639 A1\* 5/2012 Giraud ................. G02B 6/4454
  385/135

\* cited by examiner

REVERSIBLE INTERNET SERVICE PROVIDER WALL BOX

TECHNICAL FIELD

The present invention generally relates to communications equipment, and particularly relates to termination boxes that are used for the storage of communication network cabling and hardware.

BACKGROUND

Today's communication networks provide transport of voice, video and data to both residential and commercial customers using a variety of transmission mediums. Examples of these transmission mediums include coaxial cable, telephone cable (e.g., twisted pair) and fiber optic cable. In fiber optic networks, information is transmitted from one location to another by sending pulses of light through the fiber optic cables. Fiber optic transmission provides several advantages over other electrical transmission techniques, such as increased bandwidth and lower losses.

Delivery of internet service to a customer's building requires termination (e.g., splicing, connecting, etc.) of the customer-side cabling with the service-provider network cabling. Internet service providers typically use enclosures to securely store the terminations of the cabling and the associated hardware. These enclosures provide a dedicated space that protects the cabling and the hardware. Exemplary equipment that is commonly stored in these enclosures includes cabling (e.g., coaxial cable, twisted pair, fiber optic, etc.), standardized connectors (CAT 5, RJ45, SC, LC, etc.), mounting brackets, cassettes, etc. When servicing is required, the interior volume of these enclosures must be accessed so that an installer can make repairs or modifications to this equipment.

Installers encounter a variety of different settings to effectuate internet service provider terminations. Different enclosure designs are used by installers, depending on the configuration of the building and/or space that is available for the placement of the enclosure. For example, in some cases, an enclosure that is designed to be placed within the walls (e.g., between the studs) of a customer building is used. In other cases, an enclosure that is designed to be placed outside of the walls of a customer building is used. These different enclosure designs detrimentally impact cost and installation time for network installers.

SUMMARY

A telecommunications box for securing and storing telecommunications hardware is disclosed. According to an embodiment, the telecommunications box includes a base frame having generally planar outer walls that form an enclosed loop around an interior volume. A depth of the interior volume extending from front-facing edge sides of the outer walls to rear-facing edge sides of the outer walls. The base frame additionally includes a flange that adjoins the front-facing edge sides of the outer walls and extends away from the outer walls in an opposite direction as the interior volume. The base frame additionally includes a first window that exposes the interior volume from a front side of the base frame. The first window is at least partially defined by the front-facing edge sides of the outer walls. The base frame additionally includes a second window that exposes the interior volume from a rear side of the base frame. The second window is at least partially defined by rear-facing edge sides of the outer walls that are opposite the front-facing edge sides. The first window occupies the same footprint in a front-facing position of the base frame that the second window occupies in a rear-facing position of the base frame. The outer walls include first and second sidewalls that are parallel to and spaced apart from one another. The rear-facing position is a position that is rotationally reversed from the front-facing position by one hundred eight degrees about a vertical axis that is parallel to the first and second sidewalls.

According to another embodiment, the telecommunications box includes a base frame having generally planar outer walls that form an enclosed loop around an interior volume. The base frame additionally includes a first window that exposes the interior volume from a front side of the base frame. The base frame additionally includes a second window that exposes the interior volume from a rear side of the base frame. The telecommunications box further includes a protective lid that is configured to be secured to the base frame in a front-side-covered position and a rear-side-covered. In the front-side-covered position, the protective lid is flush against and securely affixed to the base frame and completely covers the first window. In the rear-side-covered position, the protective lid is flush against and securely affixed to the base frame and completely covers the second window.

According to another embodiment, the telecommunications box includes a base frame having generally planar outer walls that form an enclosed loop around an interior volume. A depth of the interior volume extends from front-facing edge sides of the outer walls to rear-facing edge sides of the outer walls. The base frame additionally includes a first window that exposes the interior volume from a front side of the base frame. The base frame additionally includes a second window that exposes the interior volume from a rear side of the base frame. The telecommunications box additionally includes a generally planar telecommunications hardware mounting platform affixed to at least one of the sidewalls. The mounting platform includes a front mounting surface that faces the front-facing edge sides of the outer walls and a rear mounting surface that faces the rear-facing edge sides of the outer walls. The telecommunications box additionally includes a protective lid that is configured to be secured to the base frame in a front-side-covered position and in a rear-side-covered position. In the front-side-covered position, the protective lid is flush against and securely affixed to the base frame such that the front mounting surface is completely covered by the protective lid, and the rear mounting surface is substantially exposed from the rear side of the telecommunications box. In the rear-side-covered position, the protective lid is flush against and securely affixed to the base frame such that the rear mounting surface is completely covered by the protective lid, and the front mounting surface is substantially exposed from the front side of the telecommunications box.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 6A and 6B, depicts a telecommunications box installed at a customer building in an in-wall-mounted configuration, according to an embodiment. FIG. 6A depicts the telecommunications box from a front-side perspective and FIG. 6B depicts the telecommunications box from a rear-side perspective.

DETAILED DESCRIPTION

Embodiments described herein include a telecommunications box that is designed for both an in-wall mounting configuration and out-of-wall mounting configuration. In the in-wall-mounted configuration, the interior volume of the telecommunications box that stores telecommunications hardware is contained within the wall, e.g., between the studs of the wall. Access to the storage space is provided by a low-profile lid that is nearly coplanar with the wall when secured to the telecommunications box. In the out-of-wall-mounted configuration, the interior volume of the telecommunications box that stores telecommunications hardware is disposed outside of the wall. That is, the telecommunications box protrudes away from the wall. The different mounting configurations are made possible by a reversible design that enables the telecommunications box to be reconfigured depending on whether the in-wall-mounting configuration or the out-of-wall mounting configuration are used. Aspects of this reversible design include a base frame with outer walls that form an enclosed loop around an interior volume. This base frame is open sided on both sides. More particularly, the base frame includes front-facing and rear-facing windows that permit access into the interior volume from both a front-side and a rear-side of the base frame. The telecommunications box additionally includes a protective lid that can be secured to either the front-side or the rear-side of the base frame. In this way, the base frame can used in both the in-wall-mounted configuration and the out-of-wall mounting configuration by simply selecting the orientation of the base frame (i.e., front-side facing out or rear-side facing out) and securing the protective lid to the side of the base frame that faces out.

The telecommunications box may include front-facing and rear-facing internal access panels. The front-facing and rear-facing internal access panels can be provided, respectively, in lower corners of the front and back sides of the base frame. The protective lid includes a notch at a corresponding lower corner so that, when the protective lid is placed on the base frame in either one of the in-wall mounting and out-of-wall mounting configurations, the respective access panel that faces out is not covered. Both the front-facing and rear-facing internal access panels include openings that are dimensioned to receive standardized cable connectors, e.g., ethernet ports, coaxial cable end connectors, etc. In this way, a connection to the equipment that is contained within the interior volume can be effectuated without having to remove the protective lid.

Figure 1:
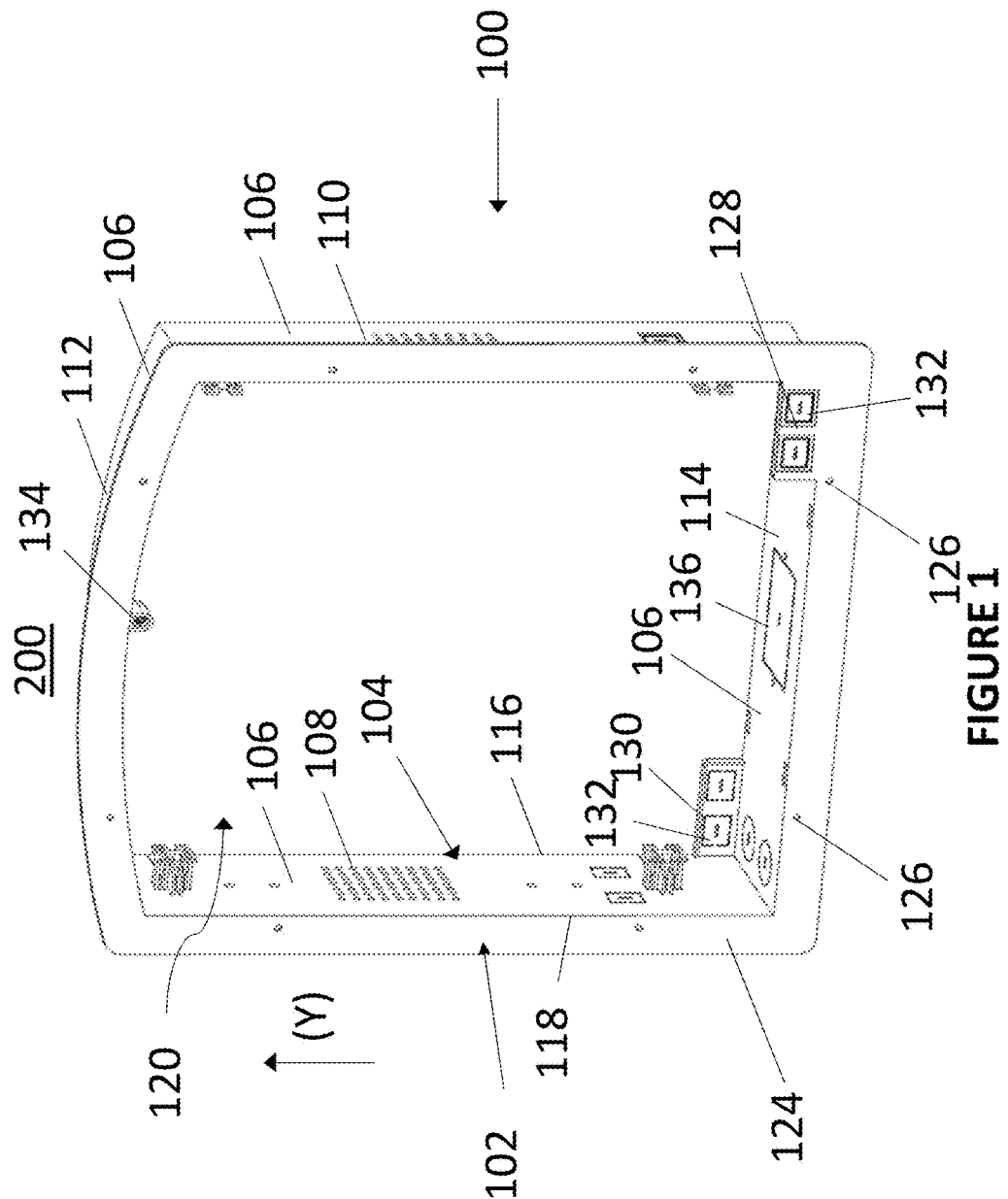
FIG. 1 depicts the front-side of a base frame of a telecommunications box from an isometric perspective, according to an embodiment.
Figure 2:
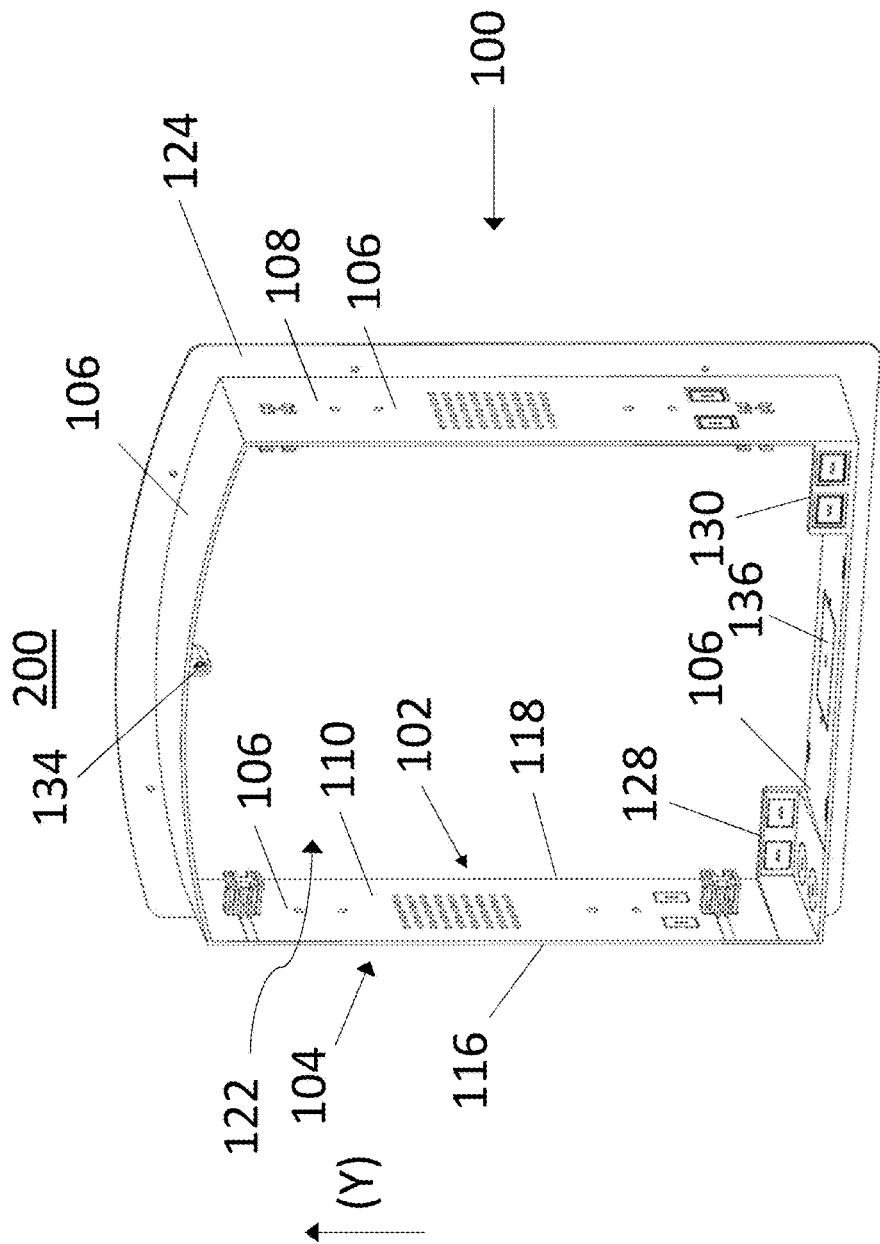
FIG. 2 depicts the rear-side of a base frame of a telecommunications box from an isometric perspective, according to an embodiment.

Referring to FIGS. 1-2, the base frame 100 of a telecommunications box 200 is depicted, according to an embodiment. FIG. 1 depicts an isometric view of the base frame 100 with the front-side 102 of the base frame 100 facing out, and FIG. 2 depicts an isometric view of the base frame 100 with the rear-side 104 of the base frame 100 facing out.

The base frame 100 includes outer walls 106 that are formed in the shape of an enclosed loop. As used herein, an enclosed loop refers to any geometric shape that forms a complete circuit, e.g., a rectangle, a circle, an octagon, etc. In the depicted embodiment, the enclosed loop is designed for insertion between two parallel spaced apart studs of a wall. To this end, the base frame 100 includes first and second sidewalls 108, 110 that are generally planar, run parallel to one another and are spaced apart from one another by a fixed distance. This distance may be correlated to a standard distance for internal studs of a wall, e.g., 16 inches, 18 inches, 24 inches, etc. The spacing between the outer faces of the first and second sidewalls 108, 110 can be set to exactly correspond to one of these distances so that a tight fit between wall studs is possible. Alternatively, this spacing can be set to be slightly less than the above described standard distances to provide loose contact with the studs and/or provide margin of error for variations in stud spacing. The enclosed loop of the base frame 100 is completed by a top wall 112 and a bottom wall 114, each of which extend between the first and second sidewalls 108, 110. In the depicted embodiment, the bottom wall 114 has a planar shape while the top wall 112 has a curved shape. Thus, the enclosed loop has an arch shape at its top side. One advantage of this arch shape is that it guides liquid (e.g., from burst pipes, drink spillage, etc.) away from the telecommunications box 200 and therefore mitigates the possibility of any liquid settling on top of the telecommunications box 200 and potentially ultimately entering the interior volume of the telecommunications box 200. More generally, the enclosed loop can have any of a variety of different geometries that are specifically tailored to application requirements, such as the desired geometry of the opening in the wall for the in-wall-mounted configuration, for example.

The enclosed loop formed by the outer walls 106 surrounds an interior volume. An interior volume refers to a three-dimensional space that is contained within the boundaries of the outer walls 106 of the base frame 100. Using the depicted base frame 100 as an example, the height of the three-dimensional space corresponds to the distance separating the top and bottom walls 112, 114; the width of the three-dimensional space corresponds to the distance separating the first and second sidewalls 108, 110; and the depth of the three-dimensional space corresponds to a minimum distance measured between rear-facing edge sides 116 and front-facing edge sides 118 of the outer walls 106. That is, the depth of the interior volume is determined by a width of the outer walls 106, as measured between the opposite facing front-facing and rear-facing edge sides 116, 118. According to an embodiment, the distance between the rear-facing edge sides 116 and the front-facing edge sides 118 is substantially identical throughout the complete base frame 100. That is, width of the outer walls 106, as measured between the front-facing edge sides 118 and the rear-facing edge sides 116 does not substantially change at any point on the base frame 100.

The base frame 100 design includes windows into the interior volume at both the front-side 102 and the rear-side 104 of the base frame 100. A first window 120 exposes the interior volume at a front-side 102 of the base frame 100. The first window 120 is shown in FIG. 1. A second window 122 exposes the interior volume at a rear-side 104 of the base frame 100. The second window 122 is depicted in FIG. 2. As a result, the interior volume that is enclosed by the outer walls 106 is accessible from either the front-side 102 or the rear-side 104 of the base frame 100. In this way, the base frame 100 can be rotated one hundred eighty degrees around a vertical axis (Y) that is parallel to the first and second sidewalls 108, 110 and access to the interior volume is possible in either orientation.

The base frame 100 additionally includes a flange 124 disposed at the front side of the base frame 100. The flange 124 is formed by a projecting collar that intersects with the front-facing edge sides 118 of the outer walls 106 and extends away from the outer walls 106 in an opposite direction as the interior volume. According to an embodiment, the flange 124 is formed by generally planar surfaces that are substantially perpendicular to the outer walls 106. In the depicted embodiment, the flange 124 is formed around the complete perimeter of the enclosed loop. Alternatively, the flange 124 can be interrupted in one or more locations. The flange 124 is configured to securely retain the telecommunications box 200 against a corresponding planar surface that directly contacts the flange 124. To this end, the flange 124 may include a number of fastener perforations that are dimensioned to receive a fastener. For example, in the depicted embodiment, the flange 124 includes circular fastener perforations 126 that permit a correspondingly dimensioned screw to be inserted through these fastener perforations and retain the telecommunications box 200 against a flat structure (e.g., a wall). More generally, a variety of fastening mechanisms (e.g., nails, clamps, adhesives, etc.) may be provided on the flange 124 as fastening mechanisms that are configured to affix the telecommunications box 200 to a flat surface.

The base frame 100 additionally includes a front-facing internal access panel 128 and a rear-facing internal access panel 130. The front-facing internal access panel 128 and the rear-facing internal access panel 130 each adjoin at least one of the outer walls 106. The front-facing internal access panel 128 extends inwards from the outer walls 106 so as to cover a portion of the interior volume. That is, the front-facing internal access panel 128 extends away from the outer walls 106 in an opposite direction as the flange 124. The rear-facing internal access panel 130 also extend inwards from the outer walls 106 so as to cover a portion of the interior volume. Thus, the front-facing and rear-facing internal access panels 128, 130 reduce the cross-sectional area of the first and second windows 120, 122, respectively. According to an embodiment, the front-facing internal access panel 128 and/or the rear-facing inter access panel 130 are substantially perpendicular to the outer walls 106. However, other angular orientations are possible.

In the depicted embodiment, the front-facing internal access panel 128 directly adjoins the bottom wall 114 and the second sidewall 110. Thus, the front-facing internal access panel 128 covers a lower corner of the interior volume. The rear-facing internal access panel 130 directly adjoins the bottom wall 114 and the first sidewall 108. Thus, the rear-facing internal access panel 130 covers a second lower corner of the interior volume that is opposite from the first lower corner. Due to this configuration, when the telecommunications box 200 is rotated around the vertical axis (Y), i.e., as is the case comparing FIGS. 1 and 2, the first and second windows 120, 122 form mirror images of one another. More generally, the front-facing internal access panel 128 and the rear-facing internal access panel 130 can be provided at any location on the front-facing edge sides 118 of the outer walls 106 and the rear-facing edge sides 116 of the outer walls 106, respectively. The location of the front-facing internal access panel 128 and the rear-facing internal access panel 130 may be selected so that these access panels mirror one another when rotated about the vertical axis (Y) in the above described manner.

Both the first and second internal access panels 128, 130 include openings 132 that are dimensioned to accommodate a standardized telecommunications end connector structure. Examples of these end connector structures include CAT5, RG11, RG45, SC, and LC connector structures, to name a few. The openings 132 in the first and second internal access panels 128, 130 can have a complementary geometry as these connector types. Alternatively, the openings 132 can have, for example, a rectangular shape, so that a connector structures that is fitted with an adapter piece (e.g., a rubber or plastic grommet) can be securely affixed within the openings 132.

According to an embodiment, the telecommunications box 200 includes a cutout 136 on the lower wall 106. The cutout 136 is a portion of the lower wall 106 that can be removed to provide access to the enclosed interior volume. When the cutout is removed, cabling such as an A/C power supply cable and/or a telecommunications cable can be routed into the interior volume.

Figure 3:
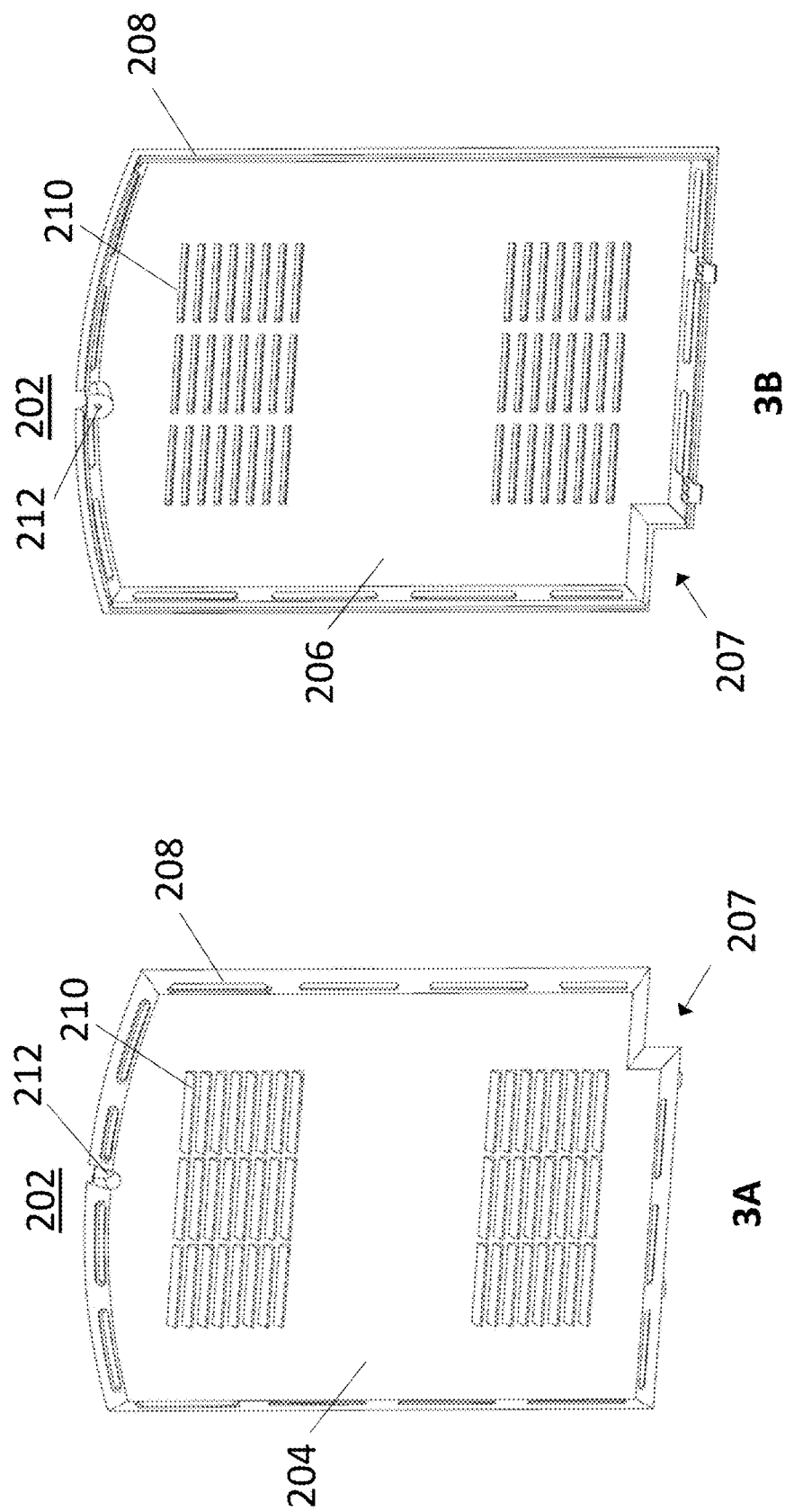
FIG. 3 depicts a protective lid that is configured to be secured to the front-side or the rear-side of the base frame, according to an embodiment.

Referring to FIG. 3, a protective lid 202 for the telecommunications box 200 is depicted, according to an embodiment. FIG. 3A depicts the outer surface 204 of the protective lid 202 from an isometric perspective, according to an embodiment. FIG. 3B depicts the inner surface 206 of the protective lid 202 from an isometric perspective, according to an embodiment. As will be illustrated in further detail below, the protective lid 202 is configured to be secured to the base frame 100 in a front-side-covered position and in a rear-side-covered position. That is, the protective lid 202 can be secured to both the front-facing edge sides 118 and the rear-facing edge sides 120 of the outer walls 106. The protective lid 202 is a generally planar structure with the same basic geometry as the enclosed loop, except for a notch 207 in the lower corner of the protective lid 202. Optionally, the protective lid 202 may include a non-perpendicular rim 208 (e.g., a bevel, as depicted) around its perimeter so that the central planar section of the protective lid 202 is elevated when the protective lid 202 is lying on a flat surface. The protective lid 202 may include slits 210 in the central planar section that are configured to permit air flow between the enclosed interior volume and the exterior environment when the protective lid 202 is secured to the base frame 100.

Figure 4:
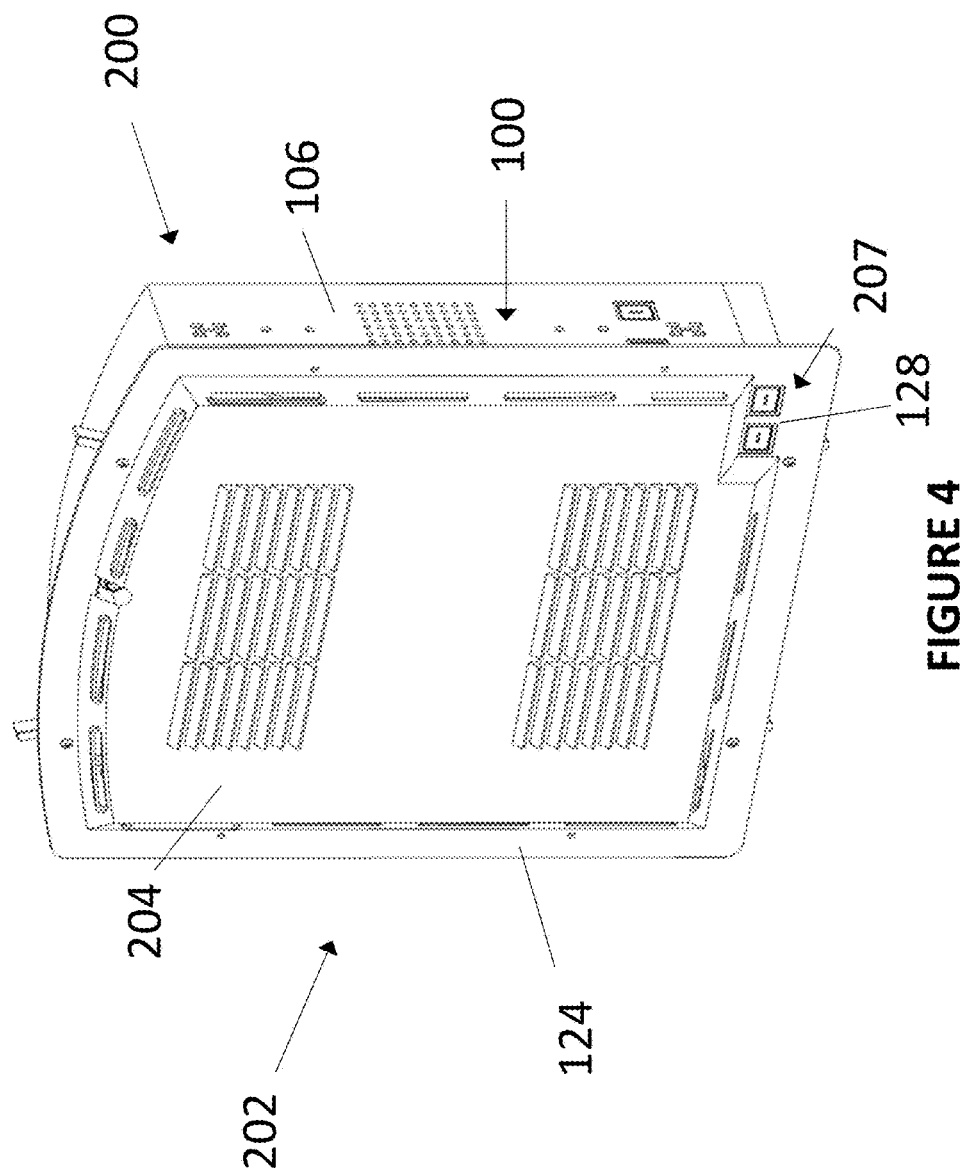
FIG. 4 depicts a telecommunications box with a protective lid that is secured to the front-side of the base frame, according to an embodiment.

Referring to FIG. 4, the telecommunications box 200 is depicted with the protective lid 202 secured to the base frame 100, according to an embodiment. This arrangement corresponds to the in-wall-mounted configuration. In this arrangement, the protective lid 202 is flush against and securely affixed to the flange 124. Moreover, the protective lid 202 completely covers the first window 120. Thus, the interior volume is not accessible from the front side of the telecommunications box 200 in this configuration. The front-facing internal access panel 128 is uncovered from the protective lid 202, due to the notch 207 in the lower corner of the protective lid 202. As a result, access to the standardized telecommunications end connector structures that are provided in the front-facing internal access panel 128 is provided when the protective lid 202 is secured to the base frame 100.

Figure 5:
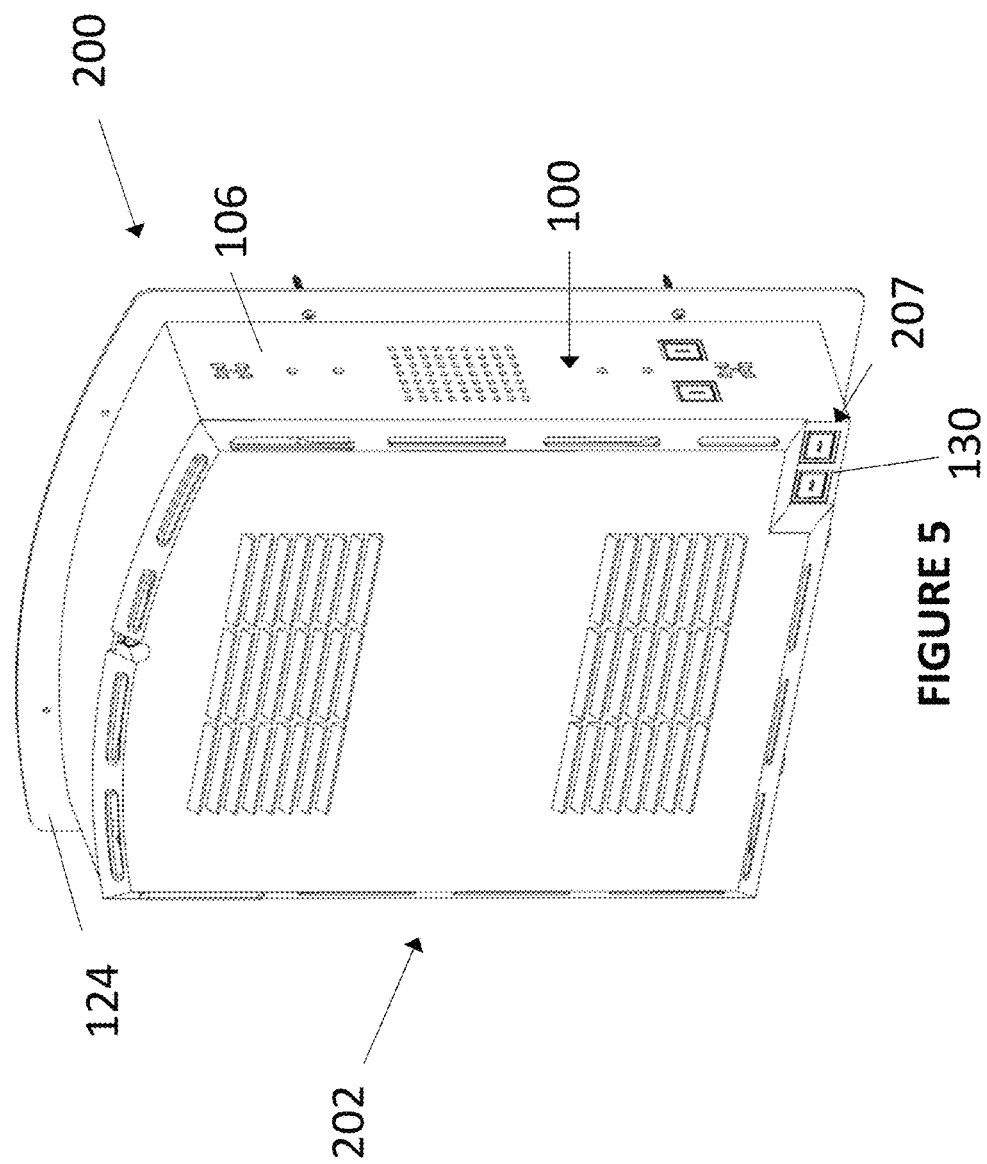
FIG. 5 depicts a telecommunications box with a protective lid that is secured to the rear-side of the base frame, according to an embodiment.

Referring to FIG. 5, the telecommunications box 200 is depicted with the protective lid 202 secured to the base frame 100, according to another embodiment. This arrangement corresponds to the out-of-wall-mounted configuration. In this arrangement, the protective lid 202 is flush against and securely affixed to the rear-facing edge sides 116 of the outer walls 106. That is, the interior volume is not accessible from the rear side of the telecommunications box 200. The rear-facing internal access panel 130 is uncovered from the protective lid 202, due to the notch 207 in the lower corner of the protective lid 202. As a result, access to the standardized telecommunications end connector structures that are provided in the rear-facing internal access panel 130 is provided when the protective lid 202 is secured to the base frame 100.

In both the in-wall-mounted configuration depicted in FIG. 4 and the out-of-wall-mounted configuration depicted in FIG. 5, the protective lid 202 is secured to the base frame 100 using a fastening mechanism, such as a screw. In the depicted embodiment, a receptacle 134 that is dimensioned to receive a screw is provided at the top wall 112 of the base frame 100 (i.e., as depicted in FIGS. 1 and 2). This receptacle 134 may be two-sided, meaning that it includes receptacles extending to both the front-edge-side 118 and the rear-edge-side 116, to enable screws to be inserted from either direction.

The protective lid 202 includes a fastener perforation 212 (as depicted in FIG. 3) that is provided in a corresponding location such that it aligns with the receptacle 134 when the protective lid 202 is placed on the base frame 100. This represents just one example of a potential mechanism for securing the protective lid 202 to the base frame 100. More generally, the number and location of the fastener perforations may vary from that which is shown. Moreover, a variety of different fastening mechanisms, e.g., clamps, push pins, adhesives, etc. may be used to securely affix the protective lid 202 against the base section.

Figure 6:
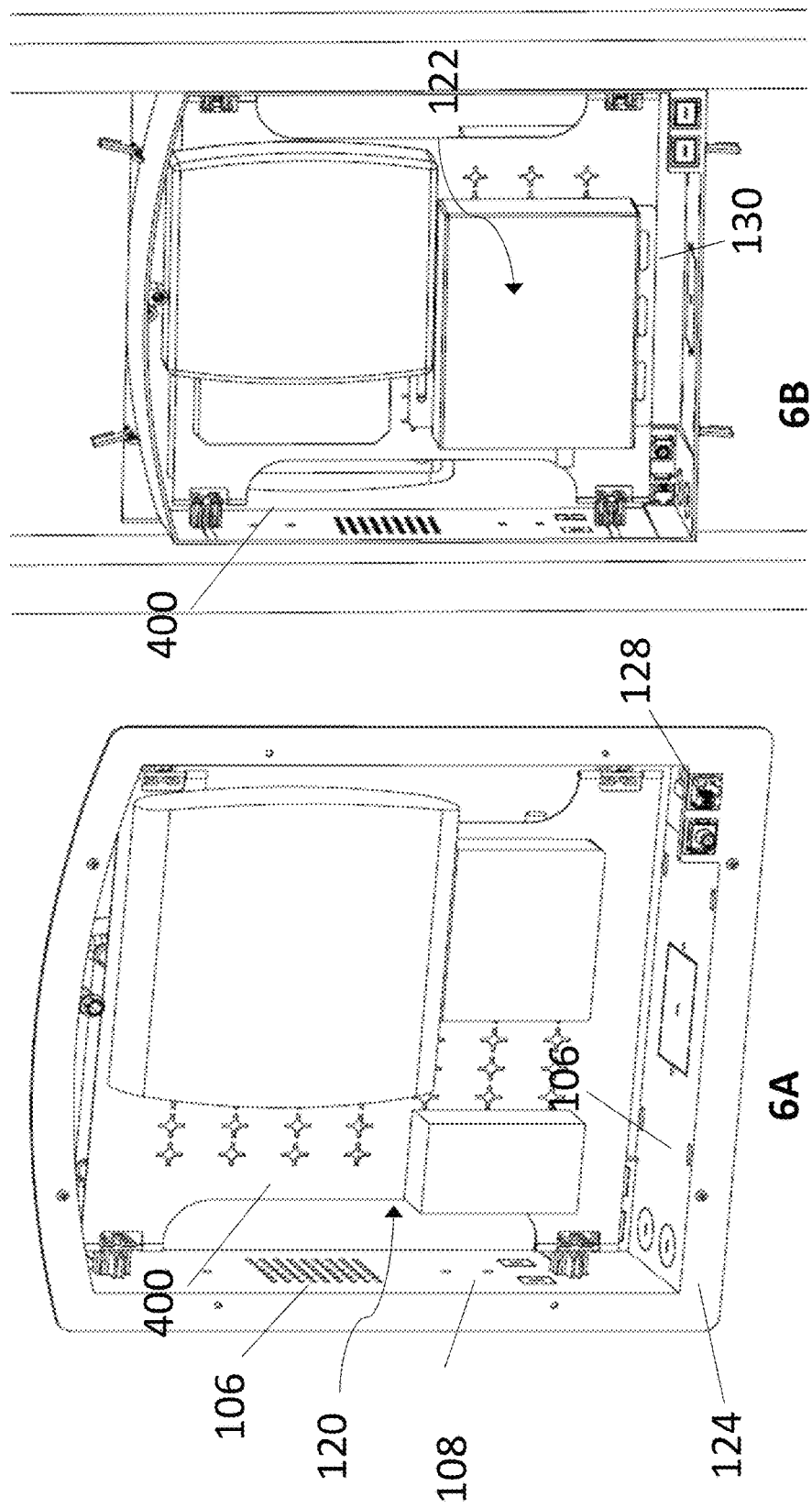
FIG. 6, which includes
Figure 7:
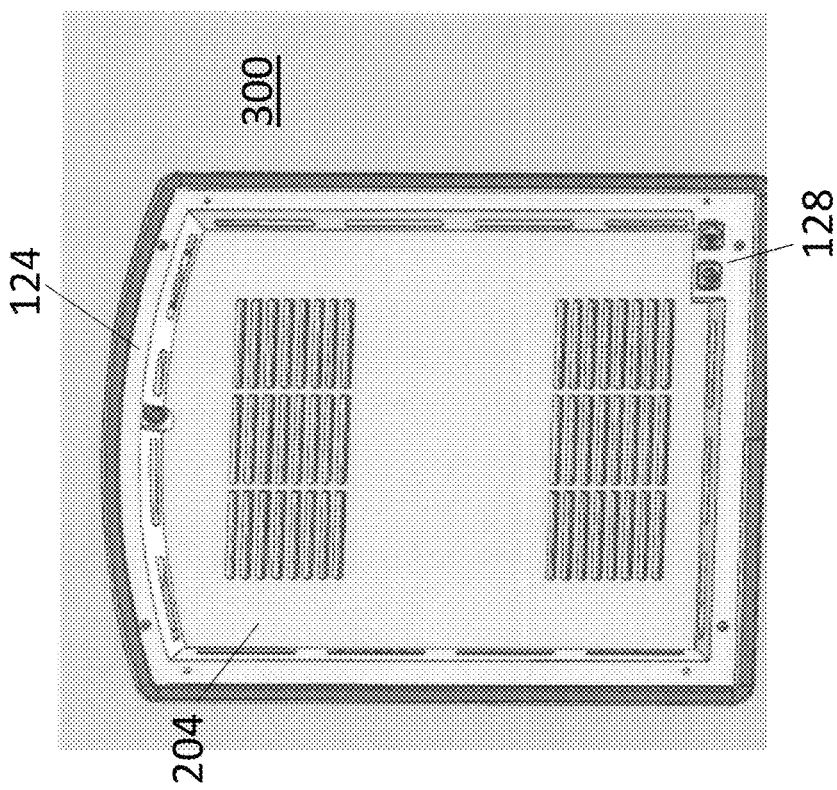
FIG. 7 depicts a telecommunications box installed at a customer building in an in-wall-mounted configuration with the protective lid secured to the front-side of the telecommunications box, according to an embodiment.

Referring to FIGS. 6-7, an in-wall-mounted configuration of the telecommunications box 200 is shown, according to an embodiment. In the wall-mounted configuration, an opening of similar size as the enclosed loop is formed in the wall 300 of the customer's building. The telecommunications box 200 is inserted into this opening such that the outer walls 106 of the base frame 100 extend into the opening in the wall 300. In this configuration, the flange 124 overhangs past the opening in the wall 300 such that the inner face of the flange 124 is flush against portions of the wall 300 that surround the opening. The first and second sidewalls 108, 110 of the base frame 100 may be flush against the studs of the wall, e.g., as shown in FIG. 6B. The telecommunications box 200 may be securely affixed to the wall by fasteners (e.g., screws) that are inserted through perforations in the flange 124 and penetrate the studs in the wall. Alternatively, a variety of different techniques, e.g., clamps, pins, adhesives, etc., can be used to secure the flange 124 to the wall. Once the telecommunications box 200 is inserted into the wall 300 and secured to the wall 300 in the above described manner, the protective lid 202 is placed over the flange 124 and securely affixed to the flange 124 in the manner described with reference to FIG. 4.

Figure 8:
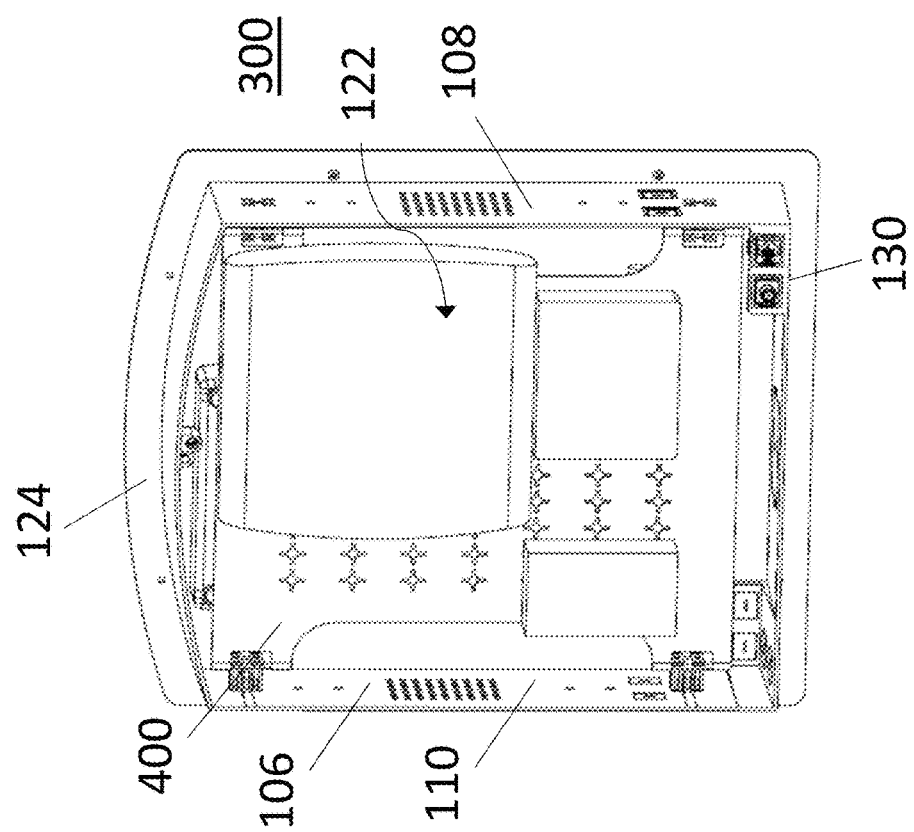
FIG. 8 depicts a telecommunications box installed at a customer building in an out-of-wall-mounted configuration, according to an embodiment.
Figure 9:
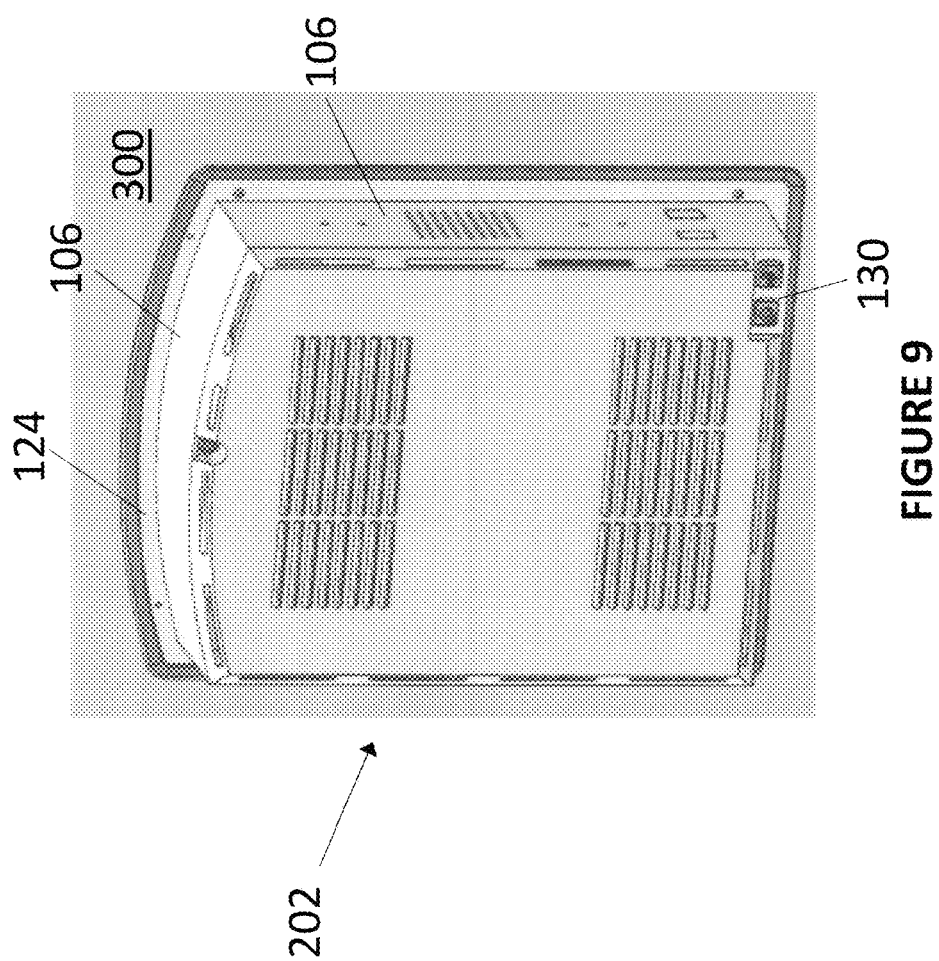
FIG. 9 depicts a telecommunications box installed at a customer building in an out-of-wall-mounted configuration with the protective lid secured to the rear-side of the telecommunications box, according to an embodiment.

Referring to FIGS. 8-9, an out-of-wall-mounted configuration is depicted, according to an embodiment. In this embodiment, the orientation of the telecommunications box 200 has been reversed from that shown in FIGS. 6-7. That is, the orientation of the telecommunications box 200 has been rotated 180 degrees around the vertical axis (Y) that is parallel to the first and second sidewalls 108, 110, i.e., in the manner described and illustrated with reference to FIGS. 1 and 2. In this arrangement, the outer face of the flange 124 directly faces and is flush against the wall 300 and the outer walls 106 of the base frame 100 extend away from the wall. The telecommunications box 200 may be securely affixed to the wall 300 by fasteners (e.g., screws) that are inserted through perforations 126 in the flange 124 and penetrate the studs in the wall 300 in a similar manner as the in-wall-mounted configuration previously described. Alternatively, a variety of different fastening structures, e.g., clamps, pins, adhesives, etc., can be used to secure the flange 124 to the wall 300. Once the telecommunications box 200 is secured to the wall 300, the protective lid 202 is securely affixed to the rear-facing edge sides 116 of the outer walls 106, i.e., in the manner described with reference to FIG. 5. In this configuration, the interior volume is enclosed on one side by the protective lid 202 and on the opposite side by the wall.

In the embodiments of FIGS. 6-9, the telecommunications box 200 includes a telecommunications hardware mounting platform 400 disposed within the interior volume. The telecommunications hardware mounting platform 400 is a generally planar surface that is affixed to one of the outer walls 106 of the base frame 100. In the depicted embodiments, the telecommunications hardware mounting platform 400 is affixed to the first sidewall 108 and/or the second sidewall 110 of the base section by hinges. The hinges may be two-way hinges that permit the telecommunications hardware mounting platform 400 is to pivot in two directions, i.e., towards the front-facing edge sides 118 and towards the rear-facing edge sides 116. More generally, the telecommunications hardware mounting platform 400 can be affixed to one of the outer walls 106 by a variety of different fastening mechanisms, e.g., hinges, screws, etc.

A variety of equipment can be mounted on the telecommunications hardware mounting platform 400. Examples of this equipment includes routers, switches, cassettes, digital circuits, amplifiers, filters, splitters, etc. The telecommunications hardware mounting platform 400 may include features that enable the secure mounting of this equipment on the platform such as fastener perforations, detents, offset surfaces, receptacles, etc.

Advantageously, the design of the telecommunications box 200 enables easy access to all of the equipment that is mounted on the telecommunications hardware mounting platform 400. In particular, the first and second windows 120, 122 are designed to expose substantially all of the telecommunications hardware mounting platform 400. The front mounting surface of the telecommunications hardware mounting platform 400 is accessible from the front-side 102 of the base frame 100 via the first window 120. Likewise, the rear mounting surface of the telecommunications hardware mounting platform 400 is accessible from the rear-side 104 of the base frame 100 via the second window 122. Moreover, in the two-way hinge configuration described above, the telecommunications hardware mounting platform 400 can be pivoted so that the rear mounting surface of the telecommunications hardware mounting platform 400 is accessible from the front-side 102 of the base frame 100 via the first window 120 and vice-versa. In this way, both the front and back facing surfaces of the telecommunications hardware mounting platform 400 can be easily accessed by an installer in both the in-wall-mounted and the out-of-wall-mounted configuration.

According to an embodiment, the first window 120 exposes at least fifty percent of the front mounting surface of the telecommunications hardware mounting platform 400 at the front side of the telecommunications box 200, and the second window exposes at least fifty percent of the rear mounting surface at the rear side of the telecommunications box 200. Greater amounts, e.g., sixty, seventy, eighty, ninety, etc. of the front mounting surface and the rear mounting surface may be exposed, respectively, by the first and second windows 120, 122. In the depicted embodiment, the entire front mounting surface and the entire rear mounting surface of the telecommunications hardware mounting platform 400 are exposed by the first and second windows 120, 122. This is due to the design of the telecommunications box 200 and the telecommunications hardware mounting platform 400. In particular, the front-facing edge sides 118 of the first, second, third and fourth outer walls 108, 110, 112 and 114 together with edge sides of the first internal access panel 128 form the first window 120 and the rear-facing edge sides 116 of the first, second, third and fourth outer walls 106 together with edge sides of the second internal access panel 132 form the second window 122. Thus, the first and second windows 120, 122 have the same area as the enclosed loop, minus the area occupied by the first and second internal access panels 128, 130, respectively. The telecommunications hardware mounting platform 400 can be dimensioned and located within the telecommunications box 200 to be completely exposed by the first and second windows 120, 122. As a result, in this embodiment, the entire front mounting surface of the telecommunications hardware mounting platform 400 is completely exposed at the front side of the telecommunications box 200 (and thus accessible by an installer). Likewise, in this embodiment, the entire rear mounting surface of the telecommunications hardware mounting platform 400 is completely exposed at the rear side of the telecommunications box 200 (and thus accessible by an installer).

The term "substantially" as used herein encompasses absolute conformity with a requirement as well as minor deviation from absolute conformity with the requirement due to manufacturing process variations, assembly, and other factors that may cause a deviation from the ideal. Provided that the deviations are not significant enough to prevent the structure from being assembled in the manner described herein, or performing any of the required functions described herein, the term "substantially" encompasses any of these deviations.

The term "generally planar" as used herein refers to a surface that mainly extends along a single plane. A generally planar surface may slightly deviate from this single plane, due to manufacturing process variations, assembly, and other factors that may cause a deviation from the ideal. Moreover, a generally planar surface may include intentionally formed structures that protrude away from the single plane, e.g., detents, retention structures, etc., provided that these intentionally formed structures represent a substantial minority (e.g., less than 10%) of the surface area of the structure.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A telecommunications box for securing and storing telecommunications hardware, the telecommunications box comprising:
    a base frame, comprising:
    generally planar outer walls that form an enclosed loop around a three-dimensional interior volume, a depth of the interior volume extending from front-facing edge sides of the outer walls to rear-facing edge sides of the outer walls,
    a flange that adjoins the front-facing edge sides of the outer walls and extends away from the outer walls in an opposite direction as the interior volume;
    a first window that exposes the interior volume from a front side of the base frame, the first window being at least partially defined by the front-facing edge sides of the outer walls,
    a second window that exposes the interior volume from a rear side of the base frame, the second window being at least partially defined by rear-facing edge sides of the outer walls that are opposite the front-facing edge sides,
    wherein the outer walls comprise first and second sidewalls that are parallel to and spaced apart from one another, and
    wherein the first window occupies the same footprint in a front-facing position of the base frame that the second window occupies in a rear-facing position of the base frame, the rear-facing position being a position that is rotationally reversed from the front-facing position by one hundred eight degrees about a vertical axis that is parallel to the first and second sidewalls.

2. The telecommunications box of claim 1, wherein the first window has a geometry that is non-symmetrical with respect to the vertical axis, and wherein the second window has a geometry that is non-symmetrical with respect to the vertical axis.

3. The telecommunications box of claim 2, wherein the base frame further comprises:
    a first internal access panel that adjoins at least one of the front-facing edge sides of the outer walls, is substantially perpendicular to the outer walls, and covers a portion of the interior volume; and a second internal access panel that adjoins at least one of the rear-facing edge sides of the outer walls, is substantially perpendicular to the outer walls, and covers a portion of the interior volume, and wherein each of the first and second internal access panels comprise openings that are dimensioned to accommodate a standardized telecommunications cable end connector, wherein the front-facing edge sides of the first, second, third and fourth outer walls together with edge sides of the first internal access panel define the first window, and wherein the rear-facing edge sides of the first, second, third and fourth outer walls together with edge sides of the second internal access panel define the second window.

4. The telecommunications box of claim 3, wherein the first internal access panel covers a first lower corner of the interior volume, wherein the second internal access panel covers a second lower corner of the interior volume that is opposite from the first lower corner.

5. The telecommunications box of claim 3, wherein the outer walls further comprise:
a third outer wall that extends between the first and second outer walls; and
a fourth outer wall that extends between the first and second outer walls and is spaced apart from the third outer wall,
wherein the fourth outer wall is substantially perpendicular with respect to the first and second outer walls, and
wherein the third outer wall forms a curved arch extending from the first outer wall to the second outer wall.

6. The telecommunications box of claim 3, further comprising:
a protective lid that is configured to be secured to the base frame in a front-side-covered position and in a rear-side-covered position,
wherein, in the front-side-covered position, the protective lid is flush against and securely affixed to the flange and the first internal access panel and completely covers the first window, and
wherein, in the rear-side-covered position, the protective lid is flush against and securely affixed to the rear-facing edge sides of the outer walls and the second internal access panel and completely second the first window.

7. The telecommunications box of claim 1, further comprising:
a telecommunications hardware mounting platform affixed to at least one of the first and second outer walls, the mounting platform comprising: a generally planar front mounting surface that is accessible from the front-side of the base frame via the first window, and a generally planar rear mounting surface that is accessible from the rear-side of the base frame via the second window.

8. The telecommunications box of claim 7, wherein the first window exposes at least fifty percent of the front mounting surface, and wherein the second window exposes at least fifty percent of the rear mounting surface.

9. The telecommunications box of claim 8, wherein the first window exposes at least ninety percent of the front mounting surface, and wherein the second window exposes at least ninety percent of the rear mounting surface.

10. A telecommunications box for securing and storing telecommunications hardware, the telecommunications box comprising:
a base frame, comprising:
generally planar outer walls that form an enclosed loop around a three-dimensional interior volume, a depth of the interior volume extending from front-facing edge sides of the outer walls to rear-facing edge sides of the outer walls;
a first window that exposes the interior volume from a front side of the base frame; and
a second window that exposes the interior volume from a rear side of the base frame;
a generally planar telecommunications hardware mounting platform affixed to at least one of the sidewalls, the mounting platform comprising a front mounting surface that faces the front-facing edge sides of the outer walls and a rear mounting surface that faces the rear-facing edge sides of the outer walls; and
a protective lid that is configured to be secured to the base frame in a front-side-covered position and in a rear-side-covered position,
wherein, in the front-side-covered position:
the protective lid is flush against and securely affixed to the base frame such that the front mounting surface is completely covered by the protective lid, and the rear mounting surface is substantially exposed from the rear side of the telecommunications box, and
wherein, in the rear-side-covered position:
the protective lid is flush against and securely affixed to the base frame such that the rear mounting surface is completely covered by the protective lid, and the front mounting surface is substantially exposed from the front side of the telecommunications box.

11. The telecommunications box of claim 10, wherein the outer walls comprise first and second sidewalls that are spaced apart from one another and substantially parallel to one another, wherein the telecommunications hardware mounting platform is affixed to the first sidewall by a two-way hinge that permits the telecommunications hardware mounting platform to pivot in a first direction so that a rear mounting surface of the telecommunications hardware mounting platform is accessible from the front side of the base frame via the first window and to pivot in a second direction so that a front mounting surface of the telecommunications hardware mounting platform is accessible from the rear side of the base frame via the second window.

12. The telecommunications box of claim 10, wherein the first window exposes at least fifty percent of the front mounting surface, and wherein the second window exposes at least fifty percent of the rear mounting surface.

* * * * *